HARRIS & ROBINSON.
Liquid Measure.
No. 66,149.
Patented June 25, 1867.
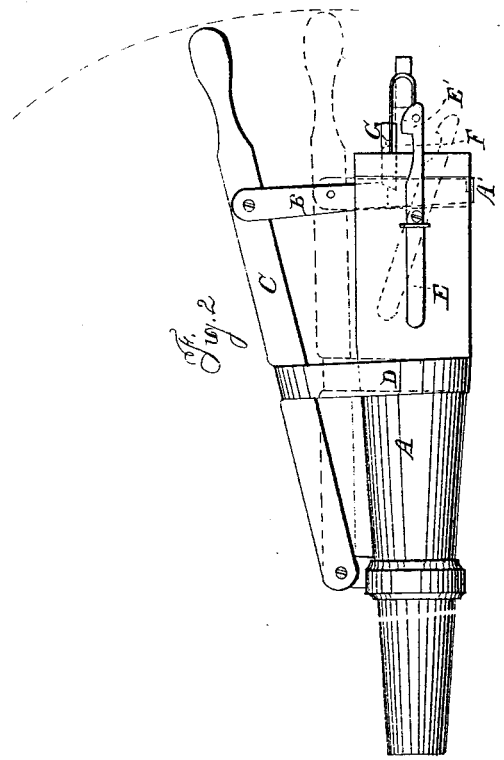
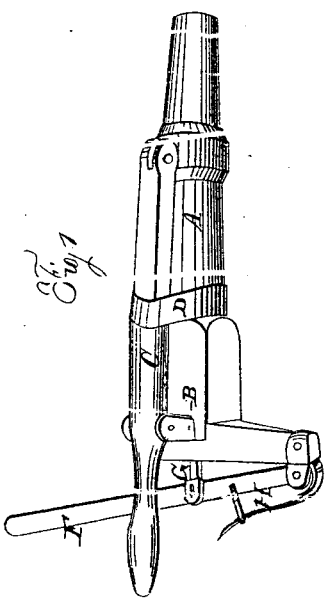
Witnesses
Inventors

United States Patent Office.

EDWARD S. HARRIS AND SYLVANUS S. ROBINSON, OF MORRISON, ILLINOIS.

Letters Patent No. 66,149, dated June 25, 1867.

IMPROVEMENT IN APPARATUS FOR DRAWING AND WEIGHING LIQUIDS.

The Schedule referred to in these Letters Patent and making part of the same.

TO ALL WHOM IT MAY CONCERN:

Be it known that we, EDWARD S. HARRIS and SYLVANUS S. ROBINSON, of Morrison, in the county of Whitesides, and State of Illinois, have invented a new and useful Improvement in Machines for Measuring Molasses and other Liquids by Weight; and we do hereby declare that the following is a full, clear, and exact description of the same, reference being had to the annexed drawings making part of this specification, in which—

Figure 1 is a perspective view, and

Figure 2 is an elevation.

The same letters are employed in both figures in the indication of identical parts.

Our improvement consists in so connecting the gate of a molasses-faucet with the beam of any ordinary scales that when any given weight of the liquid has been drawn into a vessel standing upon the platform of the scales, the rising of the beam shall disengage a spring, and by the action of the latter close the gate, thereby stopping the flow of the liquid when the amount required has been drawn from the cask.

A represents a faucet to be inserted in the head of a cask, through which the liquid is to be drawn, escaping through a vertical opening at A', the flow thereof being regulated by the gate B. The gate is operated in opening and closing by a lever, C, which is pivoted to the faucet at one end, and has a handle at the other projecting beyond the point where the gate is attached to the lever. Intermediately between the fulcrum and the gate a spring, D, is applied, the stress of which is downward. This spring we prefer to make by a band of India rubber passing around the faucet and the lever.

The gate is made to close automatically by the following arrangement: E is a trigger, pivoted to the side of the faucet, and having a notch cut in the end, as shown at E'. This notch engages a lever, F, which crosses horizontally the end of the faucet, being pivoted at the opposite end. To this lever is attached a stop, G, which passes through the end of the faucet, and bears against the gate when down, but when the gate is raised by the lever C, this stop may be pressed under the lower end of the gate, holding it open so that the liquid may flow from the cask. The tension of the spring H draws the lever F from the faucet.

The following is the operation of the device: The trigger E is connected with the beam of any scale by a rod in such manner that when the beam rises the trigger shall disengage the lever F, which is held in the notch E', the stop G being inserted under the gate B, so as to hold it open. The vessel into which the liquid is intended to be drawn, being placed on the platform of a scale, and the poise weight being set in the notch giving the weight required to be drawn, as soon as that weight has entered the vessel, the action of the beam through the connecting-rod will trip the trigger E; the lever F being instantly released, will be drawn back by the spring H disengaging the stop G, and permitting the gate to be closed by the tension of the spring D, thereby cutting off the flow of the liquid from the cask into the vessel.

What we claim as our invention, and desire to secure by Letters Patent, is—

1. The faucet A and gate B, when so arranged in combination with one another, and with a trigger and other connecting mechanism, that the gate shall be closed automatically when the trigger is tripped, substantially as and for the purpose set forth.

2. The faucet A, gate B, lever C, and spring D, in combination with the trigger E, lever F, stop G, and spring H, arranged to operate substantially as set forth.

In testimony whereof we have signed our names to this specification in the presence of two subscribing witnesses.

EDWARD S. HARRIS,
SYLVANUS S. ROBINSON.

Witnesses:
T. B. McDANIEL,
N. HOWE.